(12) United States Patent
Gulati et al.

(10) Patent No.: US 9,026,630 B2
(45) Date of Patent: May 5, 2015

(54) MANAGING RESOURCES IN A DISTRIBUTED SYSTEM USING DYNAMIC CLUSTERS

(75) Inventors: Ajay Gulati, Palo Alto, CA (US); Ganesha Shanmuganathan, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 321 days.

(21) Appl. No.: 13/160,215

(22) Filed: Jun. 14, 2011

(65) Prior Publication Data
US 2012/0324071 A1 Dec. 20, 2012

(51) Int. Cl.
G06F 15/16 (2006.01)
G06F 15/173 (2006.01)
G06F 9/50 (2006.01)
G06F 15/177 (2006.01)

(52) U.S. Cl.
CPC ............ *G06F 9/5033* (2013.01); *G06F 9/5044* (2013.01); *G06F 9/5088* (2013.01)

(58) Field of Classification Search
USPC ........................................................ 709/223
See application file for complete search history.

(56) References Cited

U.S. PATENT DOCUMENTS

| | | | | |
|---|---|---|---|---|
| 7,539,782 | B2 * | 5/2009 | Davis et al. ......................... 710/3 |
| 7,693,991 | B2 * | 4/2010 | Greenlee et al. ............... 709/226 |
| 7,694,304 | B2 * | 4/2010 | Kissell ........................... 718/104 |
| 7,725,559 | B2 * | 5/2010 | Landis et al. .................. 709/215 |
| 7,870,301 | B2 * | 1/2011 | Arndt et al. ........................ 710/8 |
| 7,941,804 | B1 * | 5/2011 | Herington et al. ............. 718/104 |
| 7,945,652 | B2 * | 5/2011 | Tsao et al. ...................... 709/223 |
| 7,996,510 | B2 * | 8/2011 | Vicente .......................... 709/223 |
| 8,095,928 | B2 * | 1/2012 | Kallahalla et al. ................ 718/1 |
| 8,112,593 | B2 * | 2/2012 | Pandey .......................... 711/154 |
| 8,166,473 | B2 * | 4/2012 | Kinsey et al. ...................... 718/1 |
| 8,180,604 | B2 * | 5/2012 | Wood et al. ........................ 703/2 |
| 8,200,738 | B2 * | 6/2012 | Roush et al. ................... 709/201 |
| 8,230,434 | B2 | 7/2012 | Armstrong et al. |

(Continued)

FOREIGN PATENT DOCUMENTS

| | | | |
|---|---|---|---|
| CN | 101765225 A | * | 6/2010 |
| CN | 102075434 A | * | 5/2011 |

(Continued)

OTHER PUBLICATIONS

Sotomayor, B. et al. "Virtual Infrastructure Management in Private and Hybrid Clouds," IEEE Internet Computing, vol. 13, Issue 5, Sep.-Oct. 2009, pp. 14-22.*

(Continued)

*Primary Examiner* — Melvin H Pollack

(57) ABSTRACT

One or more embodiments of the present invention provide a method for performing initial placement and load balancing of a data objects in a distributed system. The distributed system includes hardware resources, e.g., host systems and storage arrays, which are configured to execute and/or store data objects. A data object is initially placed into the distributed system by creating a virtual cluster of hardware resources that are compatible to execute and/or host the data object, and then selecting from the virtual cluster a hardware resource that is optimal for executing and/or hosting the data object. The data object is placed into the selected hardware resource, whereupon a load balancing operation is optionally performed across the virtual cluster. The virtual cluster is subsequently released, and the distributed system is returned to its original state with the data object included therein.

34 Claims, 15 Drawing Sheets

(56) References Cited

U.S. PATENT DOCUMENTS

| | | | | |
|---|---|---|---|---|
| 8,244,882 B2 * | 8/2012 | Davidson | | 709/228 |
| 8,250,572 B2 * | 8/2012 | Dahlstedt | | 718/1 |
| 8,271,976 B2 * | 9/2012 | Vega et al. | | 718/1 |
| 8,296,419 B1 * | 10/2012 | Khanna et al. | | 709/224 |
| 8,296,434 B1 * | 10/2012 | Miller et al. | | 709/226 |
| 8,316,110 B1 * | 11/2012 | Deshmukh et al. | | 709/220 |
| 8,341,623 B2 * | 12/2012 | Korupolu et al. | | 718/1 |
| 8,346,935 B2 * | 1/2013 | Mayo et al. | | 709/226 |
| 8,352,940 B2 * | 1/2013 | Pafumi et al. | | 718/1 |
| 8,356,306 B2 * | 1/2013 | Herington | | 718/104 |
| 8,386,610 B2 * | 2/2013 | Yahalom et al. | | 709/226 |
| 8,458,699 B2 * | 6/2013 | Dasari et al. | | 718/1 |
| 8,516,489 B2 * | 8/2013 | Laverone et al. | | 718/104 |
| 8,539,010 B2 * | 9/2013 | Inakoshi | | 708/1 |
| 8,595,364 B2 * | 11/2013 | Yahalom et al. | | 709/226 |
| 8,595,714 B1 * | 11/2013 | Hamer | | 717/170 |
| 8,612,615 B2 * | 12/2013 | Ferris et al. | | 709/229 |
| 8,615,501 B2 * | 12/2013 | Lorenz et al. | | 707/694 |
| 8,621,080 B2 * | 12/2013 | Iyoob et al. | | 709/226 |
| 8,656,448 B2 * | 2/2014 | Archer et al. | | 726/1 |
| 8,667,171 B2 * | 3/2014 | Guo et al. | | 709/238 |
| 8,671,179 B2 * | 3/2014 | Altaf et al. | | 709/224 |
| 8,677,356 B2 * | 3/2014 | Jacobs et al. | | 718/1 |
| 8,700,876 B2 * | 4/2014 | Shah et al. | | 711/173 |
| 8,713,563 B2 * | 4/2014 | Kondoh et al. | | 718/1 |
| 8,737,408 B1 * | 5/2014 | Cohn et al. | | 370/398 |
| 8,738,972 B1 * | 5/2014 | Bakman et al. | | 714/47.2 |
| 8,769,102 B1 * | 7/2014 | Zhou et al. | | 709/226 |
| 8,799,892 B2 * | 8/2014 | Hepkin | | 718/1 |
| 2008/0295096 A1 | 11/2008 | Beaty et al. | | |
| 2009/0070771 A1 | 3/2009 | Yuyitung et al. | | |
| 2009/0119664 A1 | 5/2009 | Pike et al. | | |
| 2009/0222583 A1 * | 9/2009 | Josefsberg et al. | | 709/245 |
| 2010/0100877 A1 | 4/2010 | Greene et al. | | |
| 2010/0115509 A1 * | 5/2010 | Kern et al. | | 718/1 |
| 2010/0211958 A1 * | 8/2010 | Madison et al. | | 718/105 |
| 2010/0223618 A1 * | 9/2010 | Fu et al. | | 718/102 |
| 2010/0293544 A1 * | 11/2010 | Wilson et al. | | 718/1 |
| 2010/0306382 A1 | 12/2010 | Cardosa et al. | | |
| 2011/0078467 A1 | 3/2011 | Hildebrand | | |
| 2011/0185064 A1 | 7/2011 | Head et al. | | |
| 2011/0209146 A1 * | 8/2011 | Box et al. | | 718/1 |
| 2011/0258320 A1 * | 10/2011 | Jackson | | 709/226 |
| 2012/0005346 A1 * | 1/2012 | Burckart et al. | | 709/226 |
| 2012/0096293 A1 | 4/2012 | Floyd et al. | | |
| 2012/0096461 A1 | 4/2012 | Goswami et al. | | |
| 2012/0166323 A1 * | 6/2012 | Guo | | 705/34 |
| 2012/0246317 A1 * | 9/2012 | Eriksson et al. | | 709/226 |
| 2012/0304175 A1 * | 11/2012 | Damola et al. | | 718/1 |
| 2013/0013766 A1 * | 1/2013 | Britsch et al. | | 709/224 |
| 2014/0016650 A1 * | 1/2014 | Chai | | 370/431 |
| 2014/0137117 A1 * | 5/2014 | Ding et al. | | 718/1 |

FOREIGN PATENT DOCUMENTS

| | | | | |
|---|---|---|---|---|
| EP | 2071779 A1 | * | 6/2009 | |
| IN | 201003027 I4 | * | 2/2013 | |
| JP | 05020104 A | * | 1/1993 | |
| JP | 2009163710 A | * | 7/2009 | |

OTHER PUBLICATIONS

Waldspurger, Carl. "Memory Resource Management in VMWare ESX Server," ACM Proceedings of the 5$^{th}$ Symposium on Operating Systems (SIGOPS) Design and Implementation, vol. 36, Issue SI, Winter 2002, pp. 181-194.*

Govil, Kinshuk et al. "Cellular Disco: Resource Management Using Virtual Clusters on Shared Memory Multiprocessors," ACM Proceedings of the Seventh ACM Symposium on Operating Systems Principles (SOSP), ACM SIGOPS Operating Systems Review, vol. 33, Issue 5, Dec. 1999, pp. 154-169.*

Foster, I. et al. "Virtual Clusters for Grid Communities," Sixth IEEE International Symposium on Cluster Computing and the Grid (CCGRID), vol. 1, May 16-19, 2006, pp. 513-520.*

Ajay Gulati et al., "Decentralized Management of Virtualized Hosts", U.S. Appl. No. 13/159,935, filed Jun. 14, 2011.

Ajay Gulati et al., "Decentralized Management of Virtualized Hosts", U.S. Appl. No. 13/160,358, filed Jun. 14, 2011.

Notification of Transmittal of the International Search Report and the Written Opinion of the International Searching Authority, or the Declaration; International Search Report and Written Opinion of the International Searching Authority, International Patent Application No. PCT/US2011/053741 filed Sep. 28, 2011.

Notification of Transmittal of the International Search Report and the Written Opinion of the International Searching Authority, or the Declaration; International Search Report and Written Opinion of the International Searching Authority, International Patent Application No. PCT/US2011/053745 filed Sep. 28, 2011.

Anonymous: "DRS Performance and Best Practices", Internet Article, 2008, XP002668551, Retrieved from the Internet: URL:http://www.vmware.com/files/pdf/drs_performance_best_practices_wp.pdf [retrieved on Feb. 1, 2012] pp. 1-20.

Anonymous: "VMware Distributed Resource Scheduler (DRS): Dynamic Load Balancing and Resource Allocation for Virtual Machines", Internet Article, 2009, XP002668552, Retrieved from the Internet: URL:http://www.vmware.com/files/pdf/VMware-Distributed-Resource-Scheduler-DRS-DS-EN.pdf [retrieved on Feb. 1, 2012] pp. 1-3.

* cited by examiner

MANAGING RESOURCES IN A DISTRIBUTED SYSTEM USING DYNAMIC CLUSTERS

BACKGROUND

Management software in virtualized environments is used to monitor hardware resources, such as host systems, storage arrays, and virtual machines (VMs) running in the host systems. The management software also enables resource management operations such as placement of VMs and load balancing across the host systems. One example of such management software is VMware vSphere® by VMware, Inc. of Palo Alto, Calif.

Existing resource management solutions are optimized to execute efficiently in a virtualized computing system that includes a small number of hardware resources. When the number of hardware resources included in the virtualized computing system becomes very large, such solutions do not scale well and the management thereof becomes quite inefficient. For example, a cloud-based computing system includes thousands of hardware resources that provide the physical infrastructure for a large number of different computing operations. In such cloud-based computing systems, proper initial placement and load balancing across the hardware resources is critical to avoid computing bottlenecks that can result in serious problems including a reduction in speed of VMs executing on a host system that is overloaded, potential data loss when no more free space is available in a storage array, and the like. Unfortunately, the complexity and inefficiency of load balancing scales with the number of hardware resources that are involved.

Accordingly, of benefit in the art would be a technique for providing an efficient way to manage a large number of hardware resources.

SUMMARY

One or more embodiments of the present invention provide a method for performing initial placement and load balancing of data objects in a distributed system. The distributed system includes hardware resources, e.g., host systems and storage arrays, which are configured to execute and/or store data objects, e.g., VMs and their associated virtual machine disk format (VMDK) files. A data object is initially placed into the distributed system by a method that includes the steps of creating a virtual cluster of hardware resources, i.e., a set of hardware resources, that are compatible to execute and/or host the data object, selecting from the virtual cluster a hardware resource that is optimal for executing and/or hosting the data object, and then placing the data object into the selected hardware resource. A load balancing operation can be performed across the virtual cluster. Upon completion of the load balancing operation, the virtual cluster is released, and the distributed system is returned to its original state with the data object included therein.

A method for performing initial placement of a data object in a distributed system that includes a plurality of hardware resources, according to an embodiment of the present invention, includes the steps of determining a list of hardware resources that satisfy one or more criteria of the data object, creating a virtual cluster that includes a subset of the hardware resources included in the list of hardware resources, selecting a hardware resource from the virtual cluster into which the data object is to be placed, and placing the data object into the hardware resource.

A method of performing a load balancing operation across a plurality of hardware resources, according to an embodiment of the present invention, includes the steps of receiving a signal from each of a plurality of agents, that indicates a loading level of a hardware resource on which the agent is executing, generating a list of hardware resources that are overloaded and a list of hardware resources that are underloaded, selecting, from the list of hardware resources that are overloaded, a first subset of hardware resources, selecting, from the list of hardware resources that are underloaded, a second subset of hardware resources, creating a virtual cluster that includes the first subset of hardware resources and the second subset of hardware resources, and performing a load balancing operation that causes data objects to be transferred between the hardware resources included in the virtual cluster.

A system, according to an embodiment of the present invention, configured to perform an initial placement of a data object, comprises a plurality of hardware resources and a server machine. The server machine is configured to determine a list of hardware resources that satisfy one or more criteria of the data object, create a virtual cluster that includes a subset of the hardware resources included in the list of hardware resources, select a hardware resource from the virtual cluster into which the data object is to be placed, and place the data object into the hardware resource.

Further embodiments of the present invention provide a non-transitory computer-readable storage medium that includes instructions for causing a computer system to carry out one or more of the methods set forth above.

DETAILED DESCRIPTION

Figure 1:
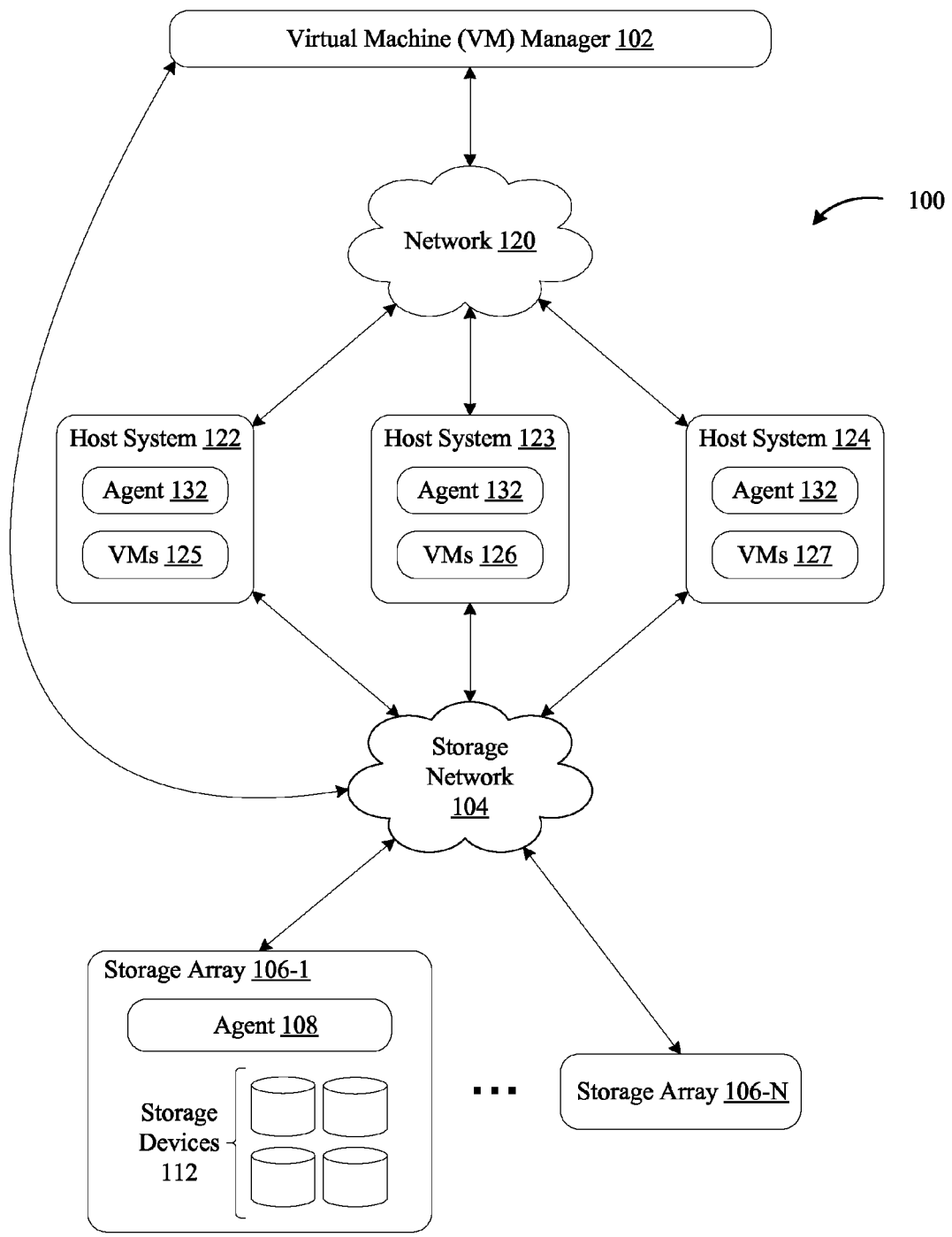
FIG. 1 depicts a block diagram of a virtualized computer system in which one or more embodiments of the present invention may be implemented.

FIG. 1 depicts a block diagram of a virtualized computer system 100 in which one or more embodiments of the present invention may be implemented. Virtualized computer system 100 includes a virtual machine (VM) manager 102, host systems 122-124, and storage arrays 106. As shown, host systems 122-124 are coupled to storage arrays 106 via a storage network 104, and are also coupled to VM manager 102 via network 120. VM manager 102 manages virtualized computer system 100 and is in communication with at least storage arrays 106 and host systems 122-124. There may be any number N of host systems included in virtualized computer system 100, each of which may comprise a general purpose computer system having one or more applications, virtual machines, or other entities that access data stored in storage arrays 106. For example, host systems 122-124 include VMs 125-127, respectively.

In some embodiments, VMs 125-127 run on top of a hypervisor (not shown), which is a software interface layer of the host system that enables sharing of the hardware resources of the host system. The hypervisor may run on top of an operating system executing on the host system or directly on hardware components of the host system. Each VM includes a guest operating system and one or more guest applications. The guest operating system is a master control program of the VM and forms a software platform on top of which the guest applications run. As also shown, an agent 132 is included in each of host systems 122-124. Information associated with the virtualization settings and configuration of host systems 122-124, and VMs 125-127 included therein, is transmitted to VM manager 102 via agent 132. In one embodiment, VM manager 102 interacts with agent 132 on each host system to exchange information using application programming interface (API) calls.

VM manager 102 communicates with storage arrays 106 via storage network 104 and is configured to interact with agent 108 to coordinate storage of VM data files, such as small VM configuration files and large virtual disks, within storage devices 112 included in each of storage arrays 106. VM manager 102 may also obtain information associated with storage arrays 106 by communicating with any agent 132 executing in host systems 122-124, where the agent 132 communicates with one or more storage arrays 106 and maintains information associated therewith. For example, agent 132 may be configured to communicate with agent 108 to manage a table of information associated with any of storage arrays 106 such that VM manager 102 is not required to be in direct communication with storage arrays 106. The communication between agents may be performed periodically or on demand depending on the configuration of virtualized computer system 100.

In one embodiment, agent 108 is a computer program executing on one or more processors. Each storage array 106 may also include a plurality of storage processors. Both storage network 104 and network 120 may be a wide area network, a local area network, or a network hosting a protocol especially suited for storage arrays, such as Fibre Channel, iSCSI, HyperSCSI, etc. For example, storage network 104 may comprise one or more of Fibre Channel switches. Each of storage arrays 106 may be any type of storage array such as a network-attached storage (NAS) filer. While storage arrays are typically made up of a plurality of disks, it should be recognized that as prices for solid-state non-volatile storage devices continue to decrease, non-volatile storage is increasingly taking the place of rotating disk storage media. The use of the term, "disk" herein, should therefore not be construed as limited only to rotating disk storage media, but also what is become known as solid state disks, or "SSDs."

Figure 2:
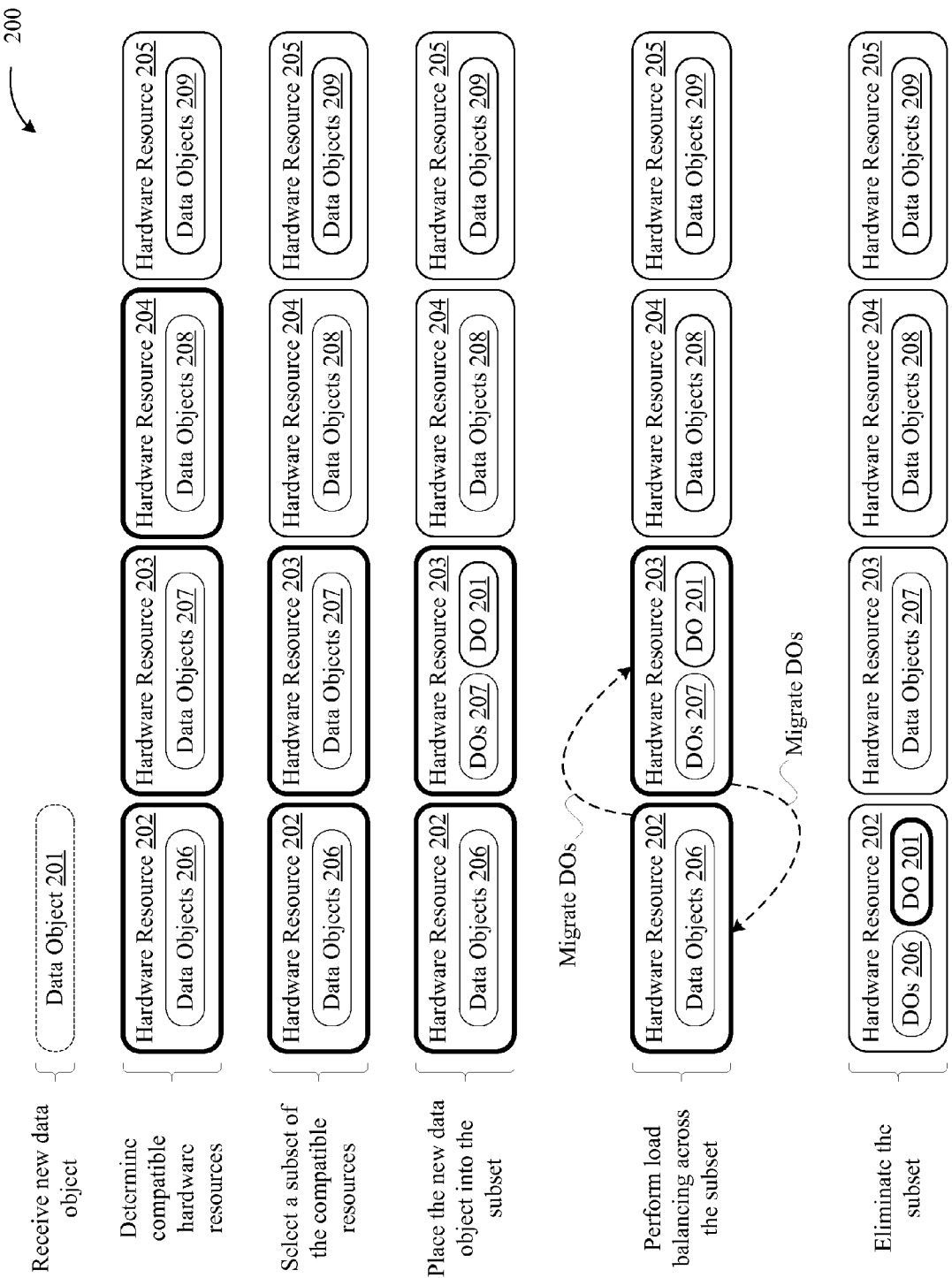
FIG. 2 illustrates an initial placement of a data object into a distributed system, according to one or more embodiments of the present invention.

As described in greater detail herein, embodiments of the invention provide a technique for initial placement of VMs within host systems 122 and, further, initial placement of VM data files within storage arrays 106. Embodiments of the invention further provide a technique for performing load balancing across host systems 122 and/or storage arrays 106. Though FIG. 1 illustrates a virtualized computer system 100, embodiments of the invention may also be implemented in any distributed system, such as in a distributed system 200 illustrated in FIG. 2. As shown, distributed system 200 includes hardware resources 202-205 that execute and/or store data objects 206-209, respectively. In FIG. 2, hardware resources 202-205 conceptually represent computerized hardware resources, e.g., host systems 122-124 running VMs and/or storage arrays 106, configured to host their related data or host systems and/or storage arrays of non-virtualized computer systems. The introduction of a new data object that requires execution and/or hosting by distributed system 200 is handled so that the data objects are properly balanced across distributed system 200, as described in further detail herein.

For example, in FIG. 2 a data object 201 is received that needs to be placed within one of hardware resources 202-205. The process begins by determining which hardware resource of hardware resources 202-205 is compatible to execute and/or store data object 201. In the example illustrated herein, hardware resources 202 and 203 are selected to be in the subset. The latency and the complexity of a subsequent load balancing operation are reduced when operating on this subset relative to operating on the full set of hardware resources 202-205.

After the subset is established, data object 201 is associated with one of the hardware resources in the subset. In the example illustrated in FIG. 2, the data object 201 is associated with hardware resource 203. A variety of techniques may be used to determine which hardware resource of the subset of hardware resources should initially receive data object 201, as described in further detail herein. Next, load balancing is optionally performed across the hardware resources in the subset. Various load balancing techniques may be implemented, such as those provided by Distributed Resource Scheduler™ by VMware, Inc. of Palo Alto, Calif. As shown, the load balancing causes data object 201 to be migrated from hardware resource 203 to hardware resource 202. In some embodiments, data object 201 is migrated based on the technique for load balancing that is used, what load is encountered subsequent to the addition of data object 201 to hardware resource 202, and the like. For example, hardware resource 203 may receive both data object 201 and an additional data object at substantially the same time, such that the load balancing that occurs thereafter determines that it is more appropriate for hardware resource 202 to execute and/or store data object 201 than hardware resource 203. Upon completion of the initial placement of data object 201 and/or the load balancing of the subset, the subset is released. It is noted that the subsets described herein are logical entities, and that when the subsets are released, the hardware resources included therein remain intact.

FIGS. 3A-3E illustrate an initial placement of a VM data file 302, e.g., a VMDK, into a storage array 106, according to one or more embodiments of the present invention. As shown, VM manager 102 is in communication with storage arrays 306-314 via storage network 104, as described above in FIG. 1. Storage arrays 306-314 are each capable of storing VM data files, e.g., VMDKs. In the example shown in FIGS. 3A-3E, VM manager 102 receives a request to instantiate a new VM within virtualized computer system 100. Accordingly, VM manager 102 is responsible for creating and storing a VM data file 302 associated with the VM.

VM manager 102 initializes the placement of VM data file 302 by determining which storage array of storage arrays 306-314 is compatible and/or optimized for storing VM data file 302. For example, VM data file 302 may require being stored on a storage array that offers read/write speeds that match or exceed a particular rate. In another example, VM data file 302 may require being stored on a storage array that provides high reliability, e.g., a storage array configured according to RAID-5 or RAID-6 standards. To make this determination, VM manager 102 directs a query to agent 108, where the query includes the requirements of VM data file 302. In response, agent 108 analyzes storage arrays 306-314 according to the requirements of VM data file 302 and replies to VM manager 102 with a collection of valid storage arrays that are capable of storing VM data file 302, e.g., storage arrays 306-313 (storage array 314 is invalid). Alternatively, VM manager 102 directs the query to agent(s) 132 to obtain the collection of valid storage arrays, as described above in conjunction with FIG. 1.

Figure 3A:
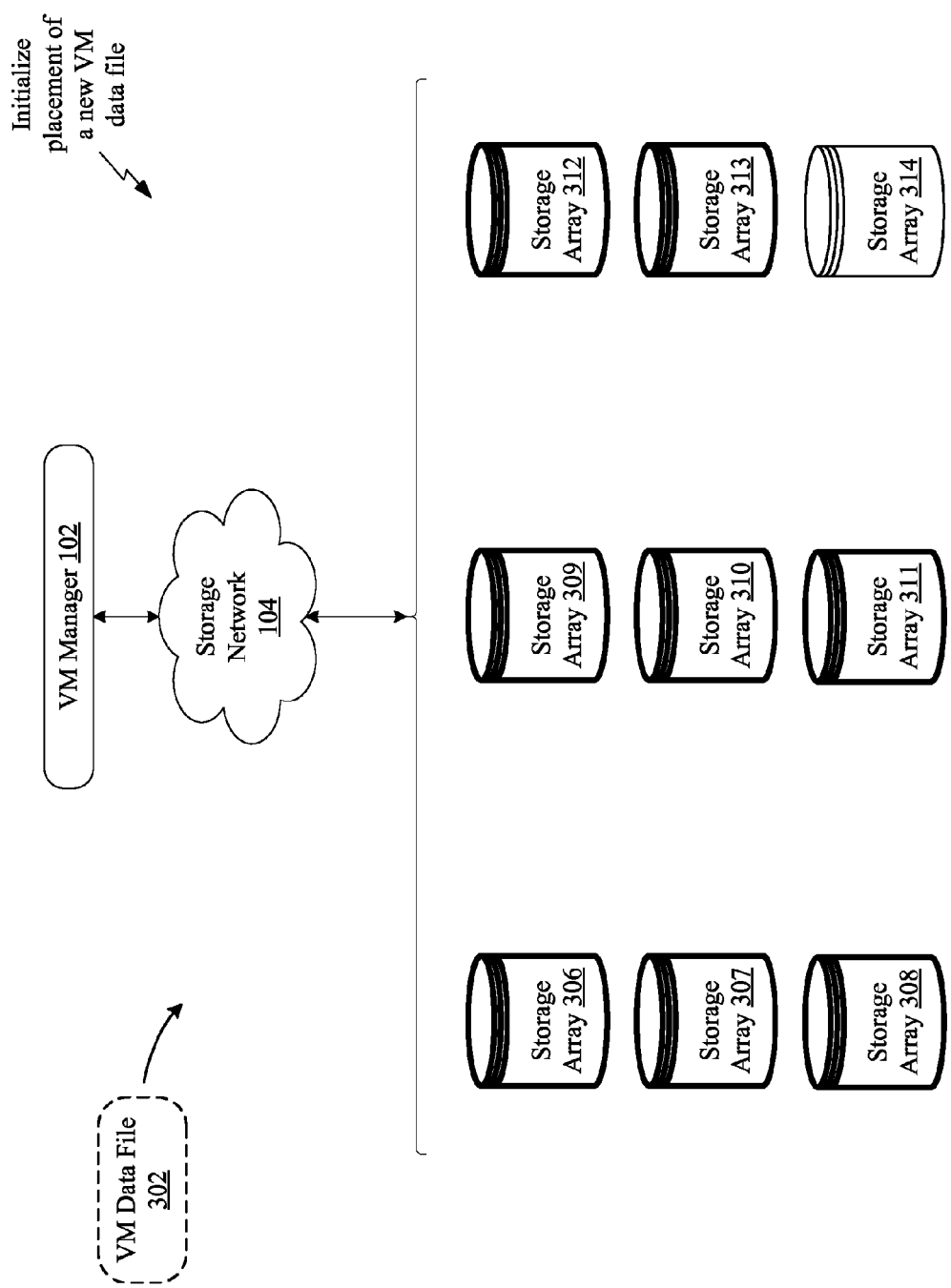
FIGS. 3A-3E illustrate an initial placement of a VM data file into a storage array, according to one or more embodiments of the present invention.
Figure 3B:
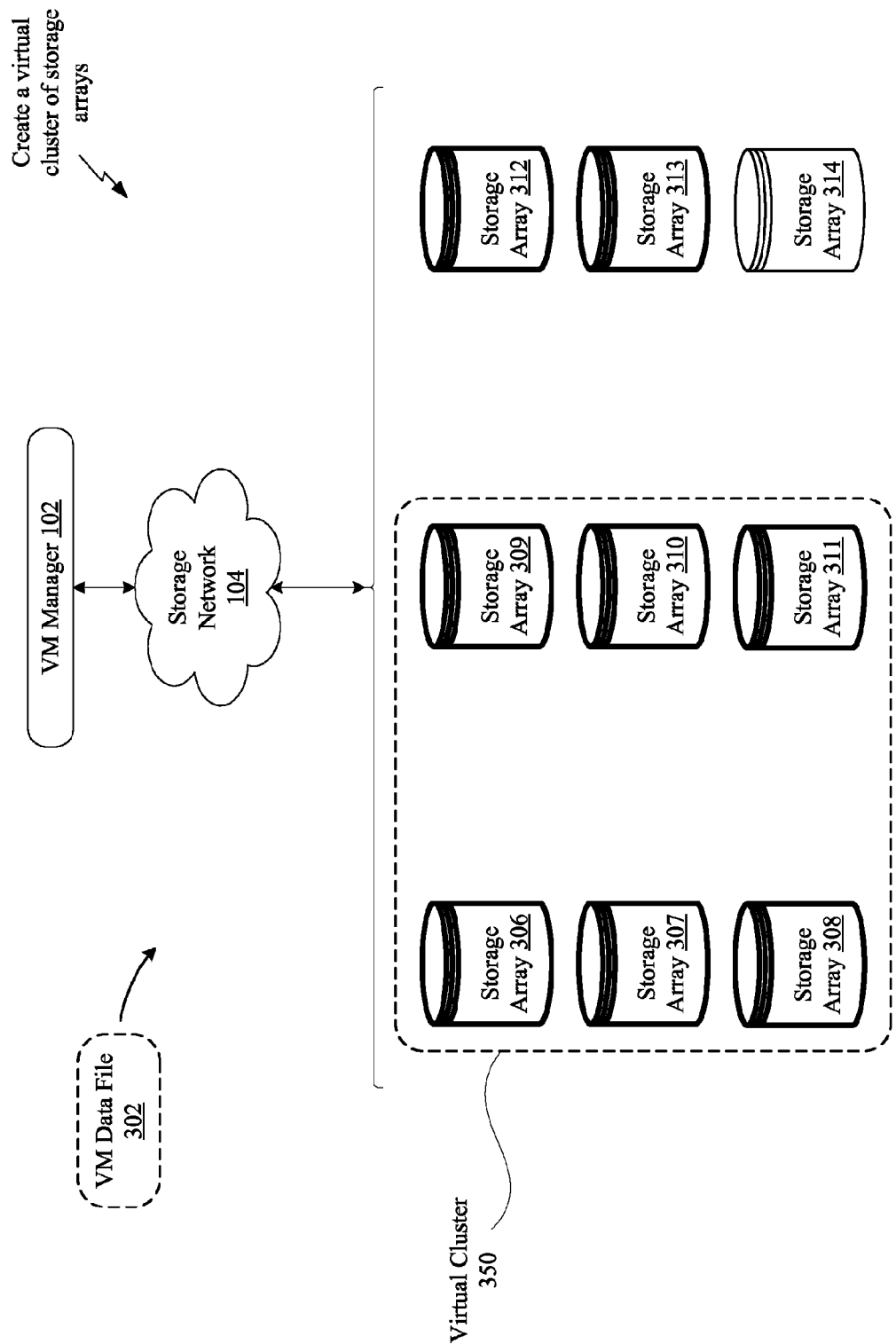

As depicted in FIG. 3B, VM manager 102 then creates a virtual cluster 350 that includes a subset of the valid storage arrays. In the example shown in FIG. 3B, virtual cluster 350 includes storage arrays 306-311. VM manager 102 may select the subset according to a variety of techniques, such as by randomly selecting a predetermined number of storage arrays from the collection of valid storage arrays, or by using a "greedy" technique that selects the subset based on one or more criteria, such as available storage space.

Figure 3C:
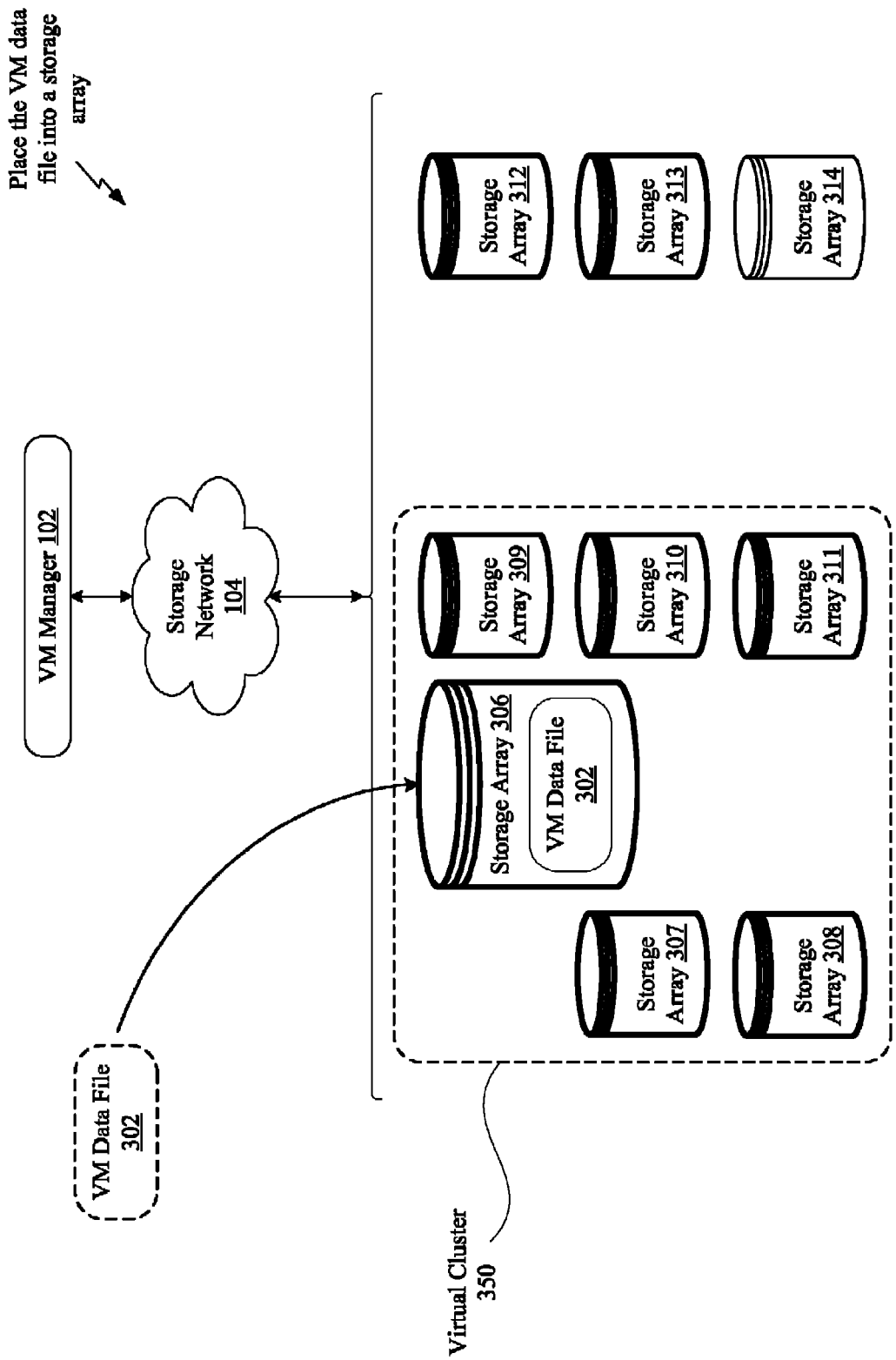

Turning now to FIG. 3C, VM manager 102 analyzes virtual cluster 350 to determine which storage array should receive VM data file 302. VM manager 102 may select a storage array from the subset according to a variety of methods. For example, VM manager 102 may select the storage array that has the most amount of free space available. Selecting the storage array that has the most amount of free space available may reduce the likelihood that VM data file 302 will be migrated shortly after its placement into a storage array when load balancing is subsequently performed across storage arrays 106.

Figure 3D:
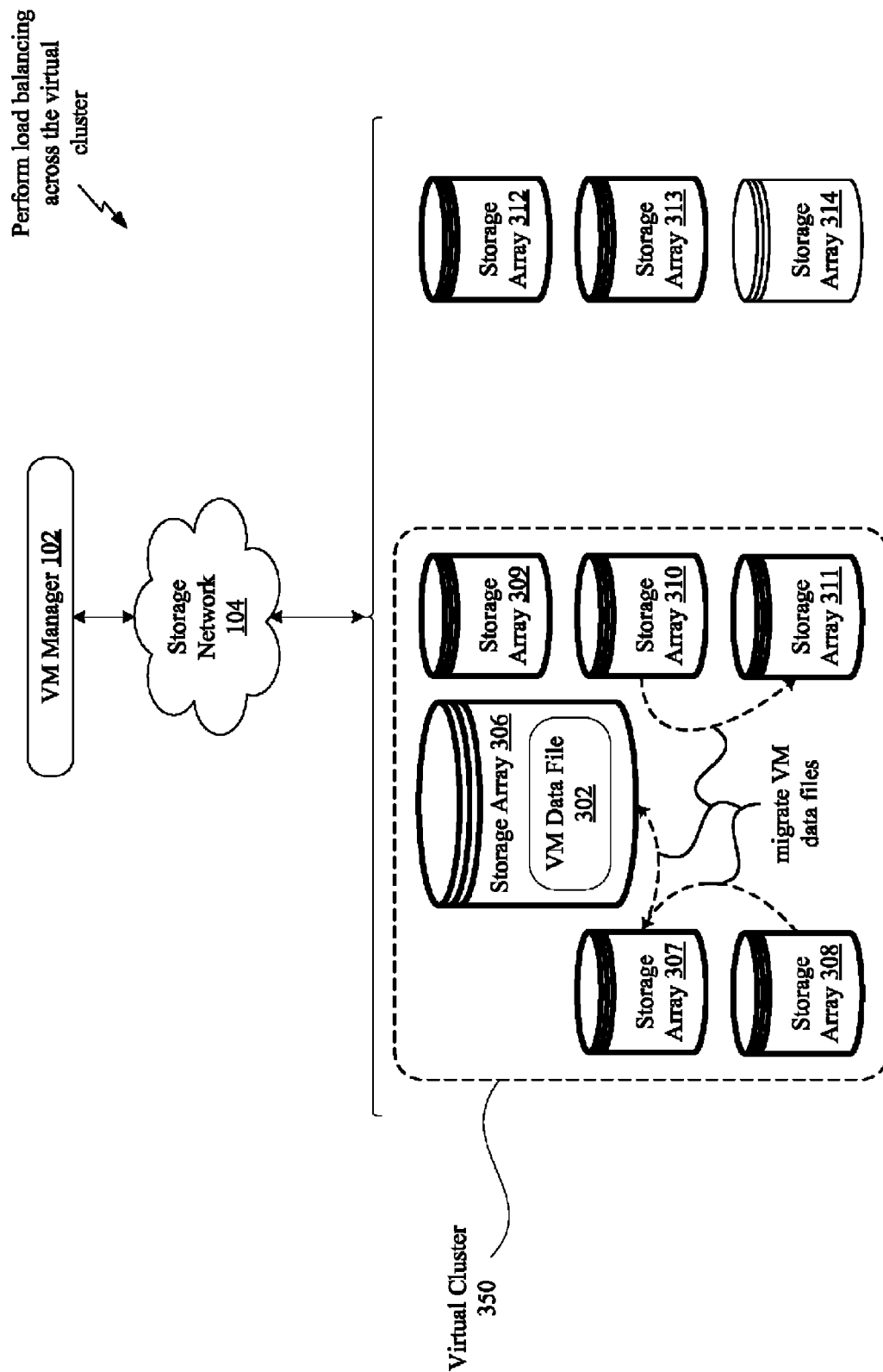

FIG. 3D illustrates VM manager 102 executing an optional I/O load balancing operation within virtual cluster 350 after VM data file 302 is added to storage array 306. As shown, VM data files may be transferred between storage arrays 306-311 in virtual cluster 350 to maintain a balance across storage devices 306-311. For example, energy-efficient power management requirements may cause the load balancing operation to migrate VM data files away from storage arrays that are nearly empty so that those storage arrays can be powered down, as described in further detail below in conjunction with FIG. 7.

Figure 3E:
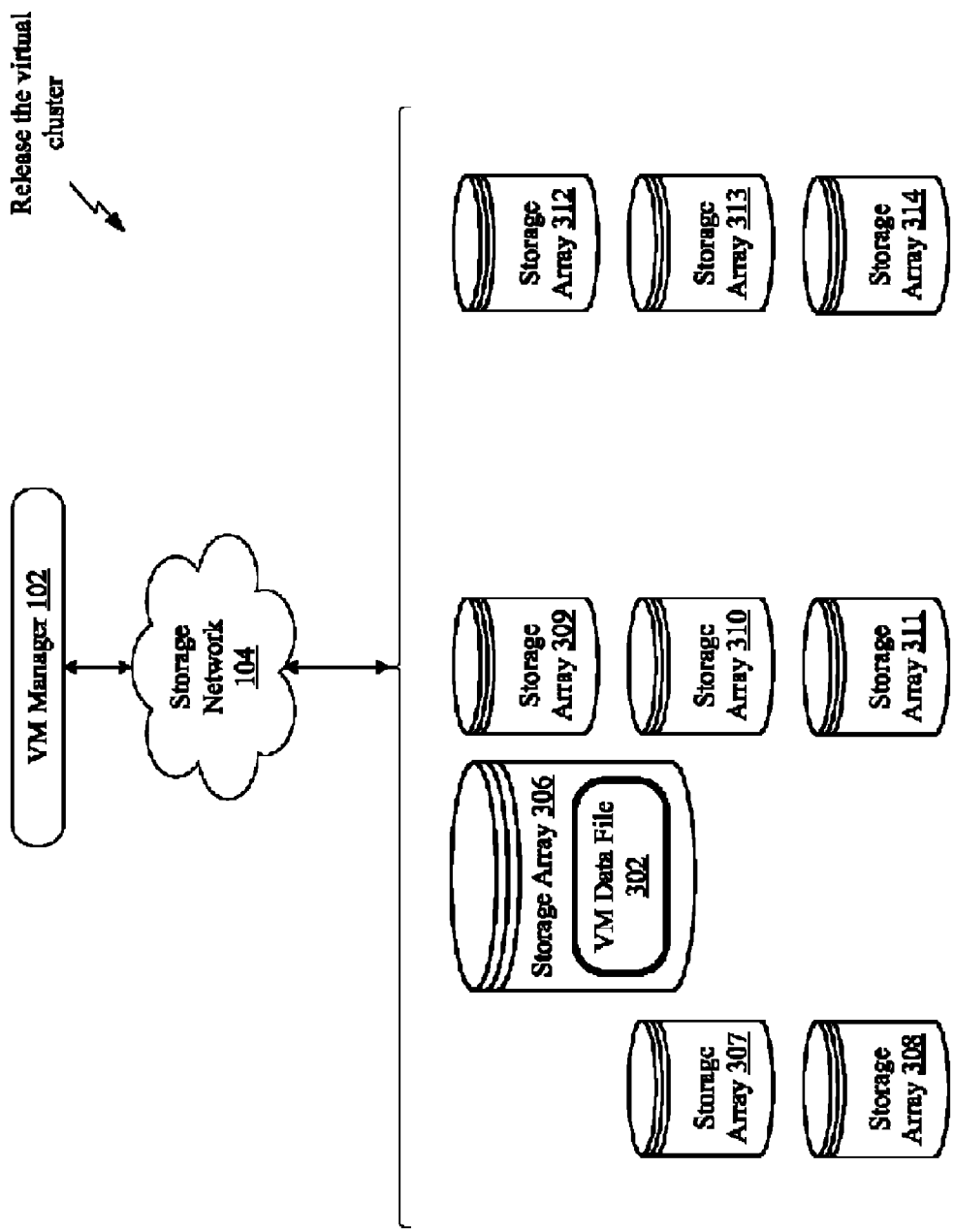

Finally, as depicted in FIG. 3E, VM manager 102 releases virtual cluster 350. As shown, VM data file 302 remains hosted by storage array 306 in which it was initially placed. Thus, according to the techniques described above in conjunction with FIGS. 3A-3E, VM manager 102 places VM data file 302 within a storage array 106 in an optimized and balanced manner without requiring the involvement of all storage arrays 306-314. In turn, this reduces the latencies of VM data file placement and also reduces the amount of overhead involved when performing subsequent and periodic load balancing operations across storage arrays 106.

Figure 4:
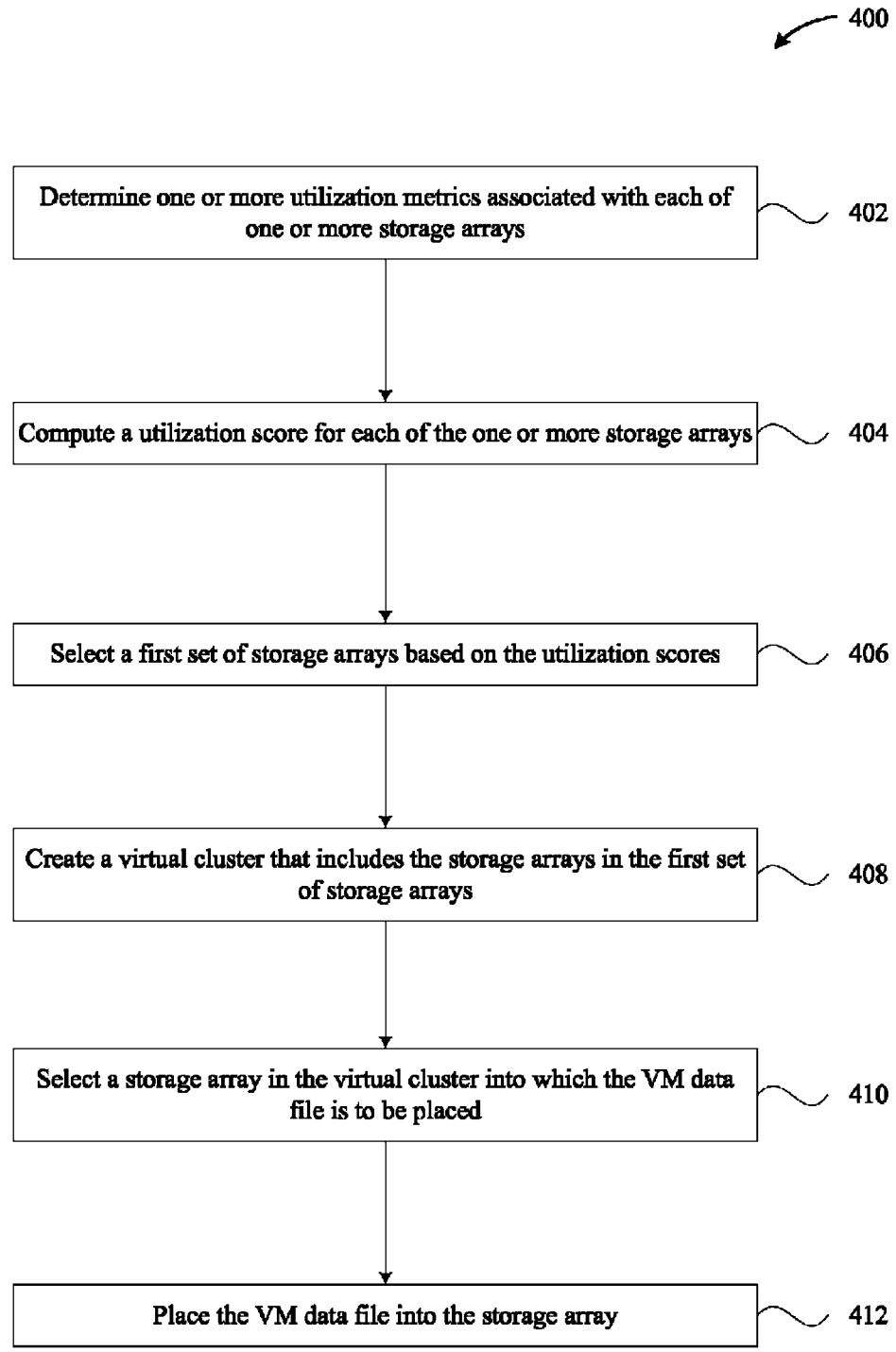
FIG. 4 is a flow diagram that illustrates a method for performing initial placement of a VM data file into a storage array, according to one or more embodiments of the present invention.

FIG. 4 is a flow diagram that illustrates a method 400 for performing an initial placement of a VM data file into a storage array, according to one or more embodiments of the present invention. At step 402, VM manager 102 determines one or more utilization metrics associated with each of one or more storage arrays, as described above in conjunction with FIG. 3A. Examples of such utilization metrics include space utilization, input/output (I/O) load, available central processing unit (CPU) and available memory resource connectivity. At step 404, VM manager 102 computes a utilization score for each of the one or more storage arrays. The utilization score may be a weighted function of one or more of the metrics described above in step 402. At step 406, VM manager 102 selects a first set of storage arrays based on the utilization scores. At step 408, VM manager 102 creates a virtual cluster that includes the storage arrays in the first set of storage arrays, as described above in conjunction with FIG. 3B. At step 410, VM manager 102 selects, based on the techniques described above in conjunction with FIG. 3C, a storage array in the virtual cluster into which the VM data file is to be placed. At step 412, VM manager 102 places the VM data file into the storage array, as also described above in FIG. 3C.

As described above in conjunction with FIGS. 3A-3E and 4, when VM data file 302 is stored in a storage array 106, a VM associated with VM data file 302, e.g., a new VM 502 described below in conjunction with FIGS. 5A-5E, may be placed in and instantiated by a host system included in virtualized computer system 100 so that the VM may be executed.

FIGS. 5A-5E illustrate an initial placement of new VM 502 within virtualized computer system 100, according to one or more embodiments of the present invention. As shown, VM manager 102 is in communication with host systems 504-513, which are each executing VMs 514-523, respectively. In the example depicted in FIGS. 5A-5E, VM manager 102 receives a request to place VM 502 within virtualized computer system 100 after VM data file 302 that corresponds to VM 502 is available and stored within storage array 306.

VM manager 102 queries agent 132 executing within each of host systems 504-513 to determine which of host systems 504-513 are compatible for hosting new VM 502. Again, such querying may be performed on-demand or may be periodically performed where the data is maintained in, e.g., a table of information, as described above. For example, VM 502 may require that the host system includes a compact disk (CD) reader, a quad-core processor, and random access memory (RAM) that runs at or above a particular frequency, e.g., 500 MHz. Each instance of agent 132 receives the query and issues a reply that indicates whether the corresponding host system satisfies the requirements of the query. In the example illustrated in FIG. 5A, host systems 504-511 are determined to be compatible to execute VM 502, as indicated by the bold line around the host systems 504-511.

Figure 5A:
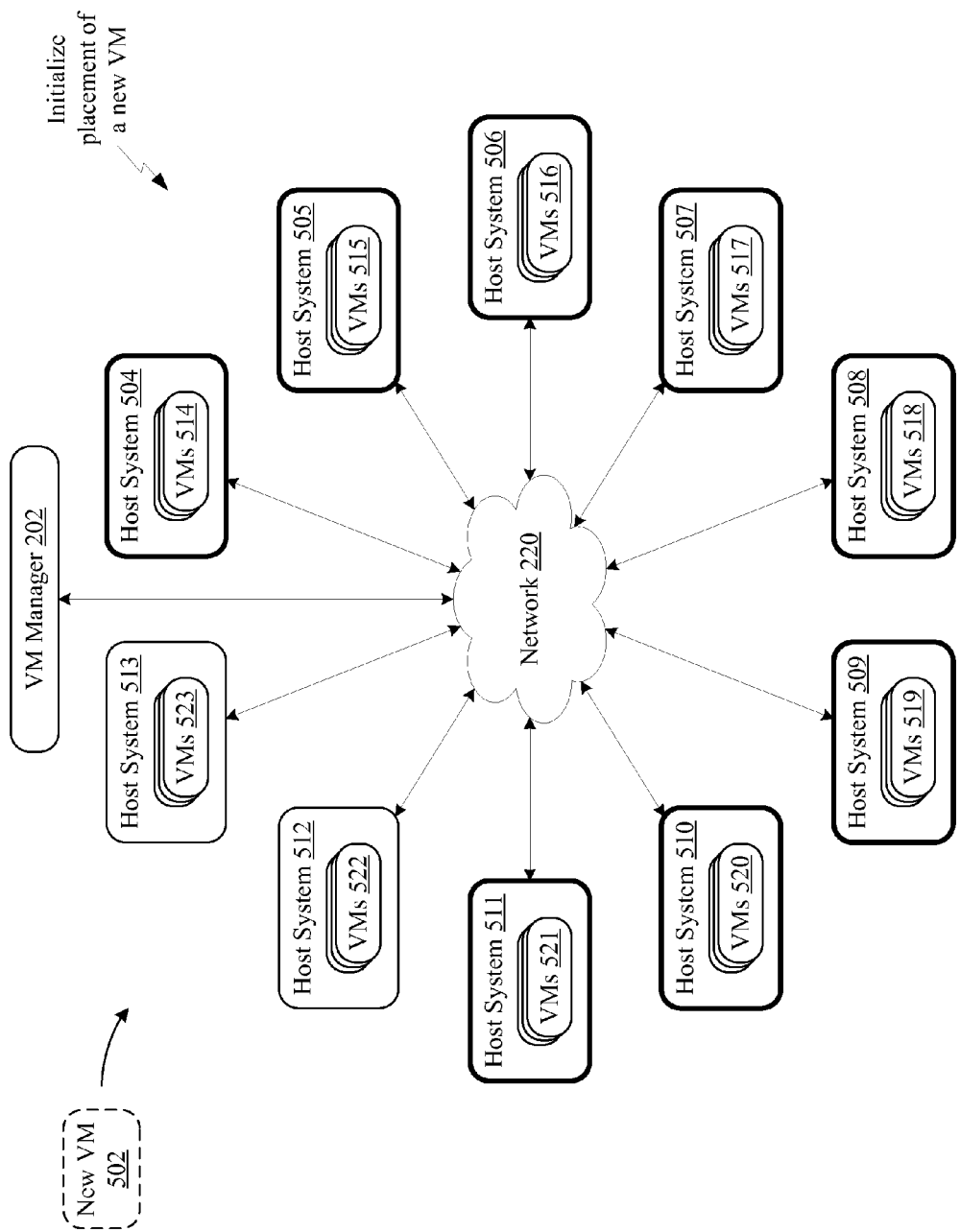
FIGS. 5A-5E illustrate an initial placement of a new VM within a virtualized computer system, according to one or more embodiments of the present invention.
Figure 5B:
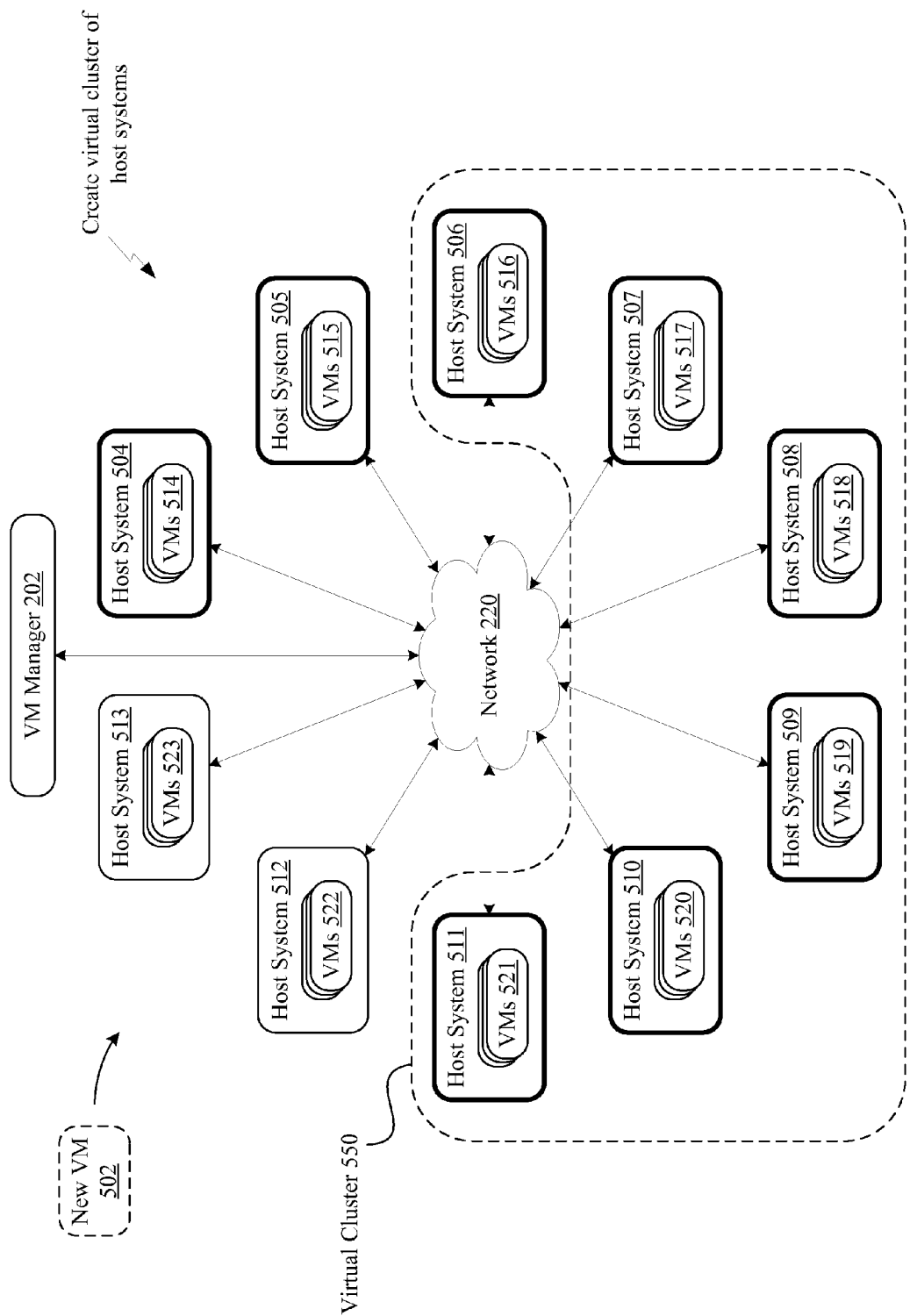

Similar to the technique described above in conjunction with FIGS. 3A-3E, a subset of host systems 504-511 is selected for performing initial placement of VM 502. As shown in FIG. 5B, VM manager 102 creates a virtual cluster 550 that includes host systems 506-511. Again, VM manager 102 may create virtual cluster 550 according to a variety of techniques, including selecting a predetermined number of host systems at random, or using a "greedy" technique that selects host systems based on one or more criteria, such as current CPU and memory utilization. Moreover, constraints such as VM-to-VM affinity rules, VM-to-VM anti-affinity rules, and VM-to-host system affinity rules, may be considered by VM manager 102 when selecting the host systems to include in virtual cluster 550.

Figure 5C:
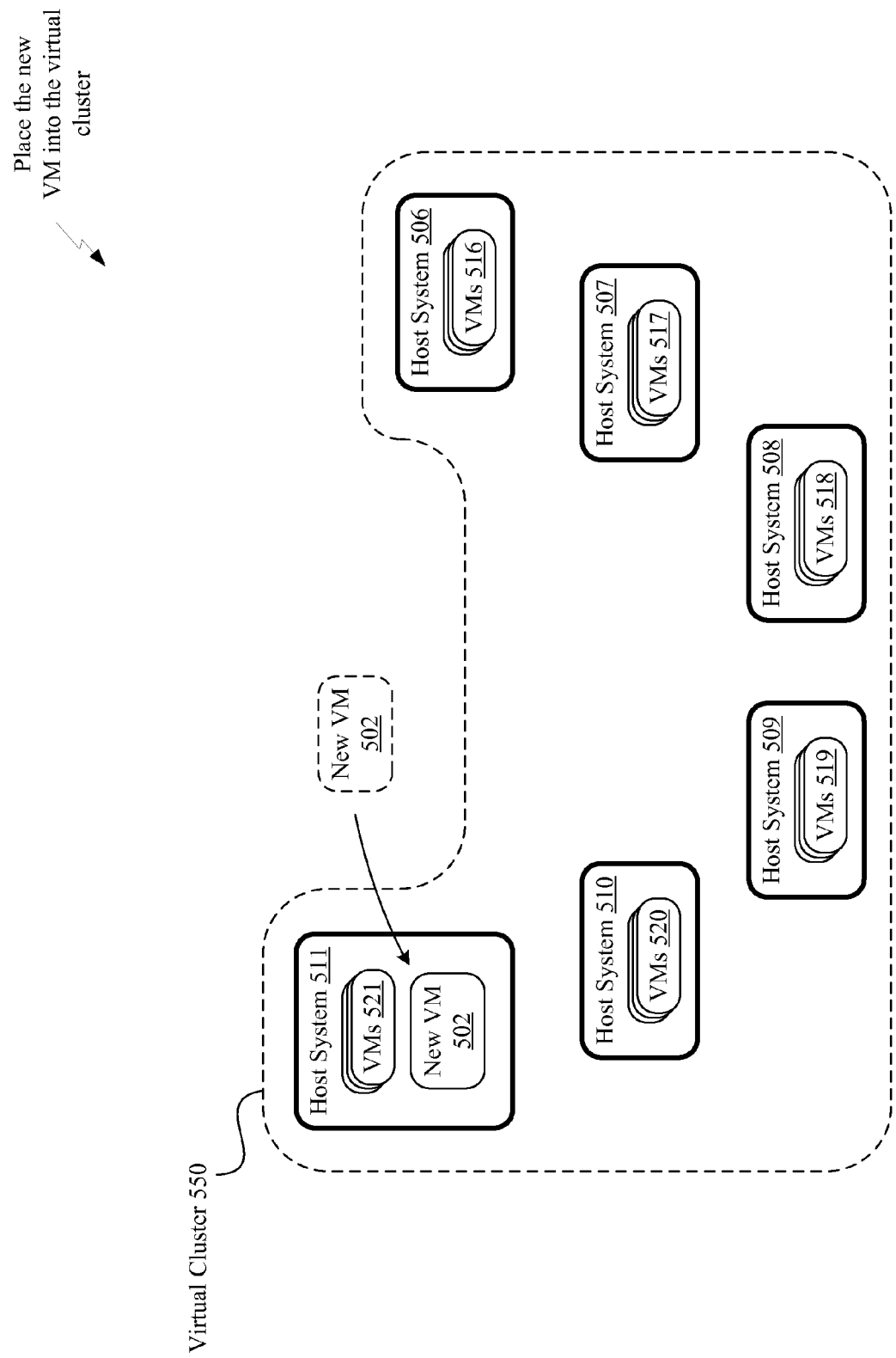

Turning now to FIG. 5C, VM manager 102 analyzes virtual cluster 550 to determine which host system should execute VM 502. VM manager 102 may select a host system according to a variety of techniques, e.g., selecting from virtual cluster 550 a host system that has the lowest CPU utilization. One example of software that performs a selection of a host system is Distributed Resource Scheduler (DRS) by VMware, Inc. of Palo Alto, Calif. Again, such techniques reduce the likelihood that VM 502 will be migrated shortly after its placement into a host system when load balancing is performed within virtualized computer system 100.

Figure 5D:
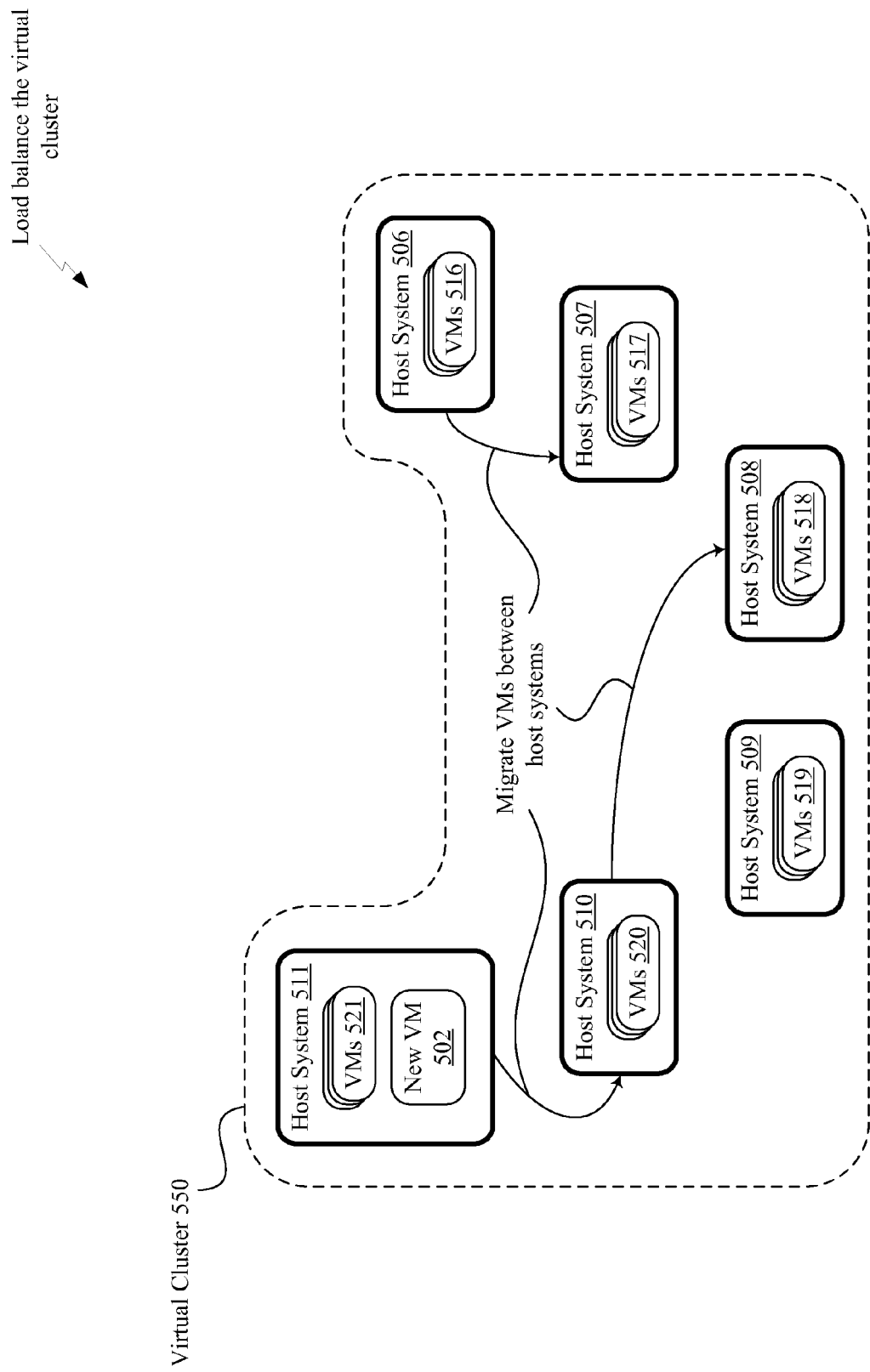

FIG. 5D illustrates VM manager 102 executing an optional load balancing operation within virtual cluster 550 after VM 502 is added to host system 511. As shown, VMs may be transferred between host systems 506-511 to maintain a balance across host systems in the virtual cluster 550. For example, the load balancing operation may be configured to move VMs between host systems 506-511 to ensure that CPUs included therein are operating at a similar level of utilization.

Figure 5E:
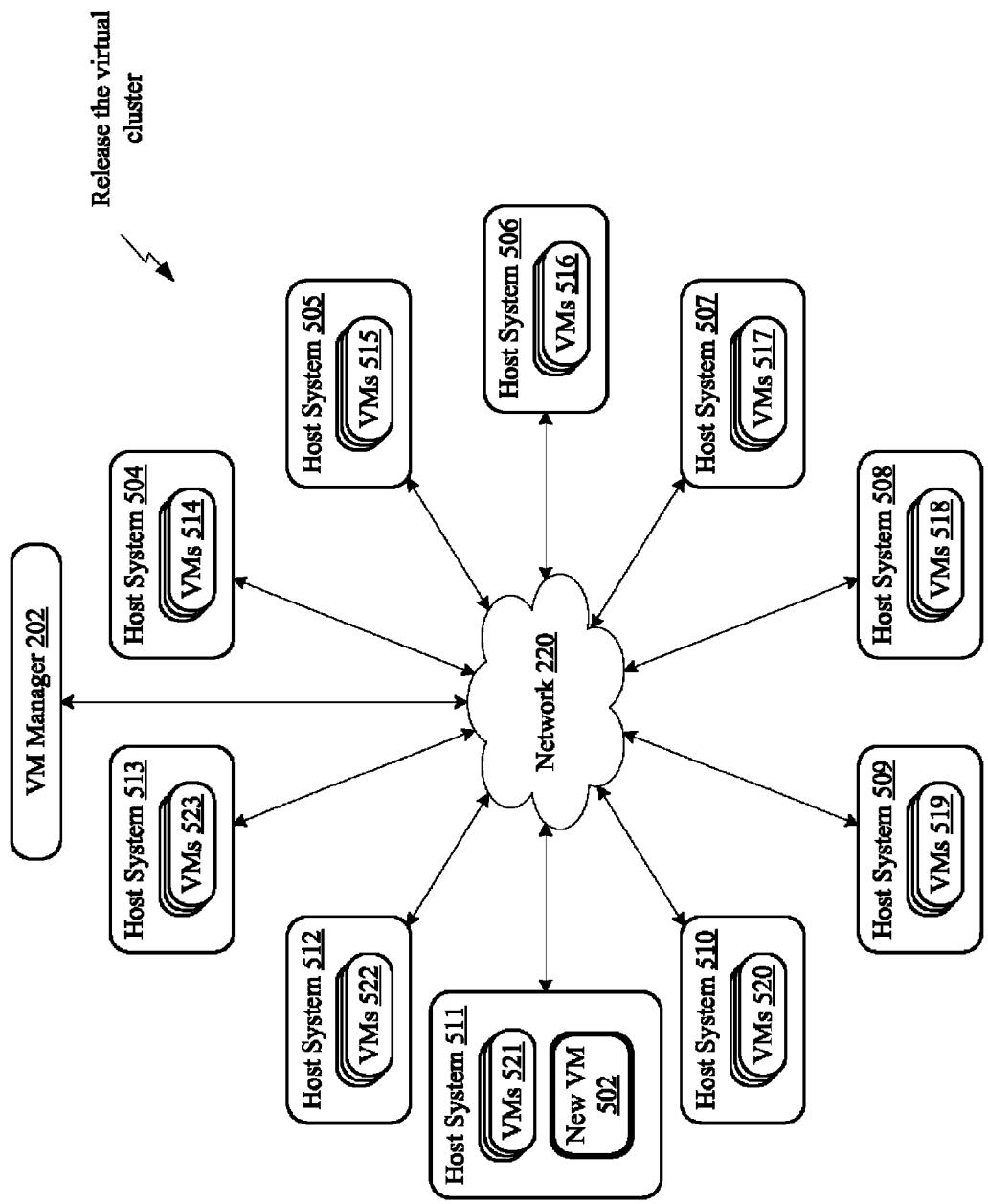

Finally, as depicted in FIG. 5E, VM manager 102 releases virtual cluster 550. As shown, new VM 502 remains hosted by host system 511 into which it was initially placed. Thus, according to the techniques described above in conjunction with FIGS. 5A-5E, VM manager 102 places VM 502 within a host system in an optimized and balanced manner without requiring the involvement of all host systems included within virtualized computer system 100. In turn, this reduces the latencies of VM placement and also reduces the amount of overhead involved when performing subsequent and periodic load balancing operations within virtualized computer system 100.

Figure 6:
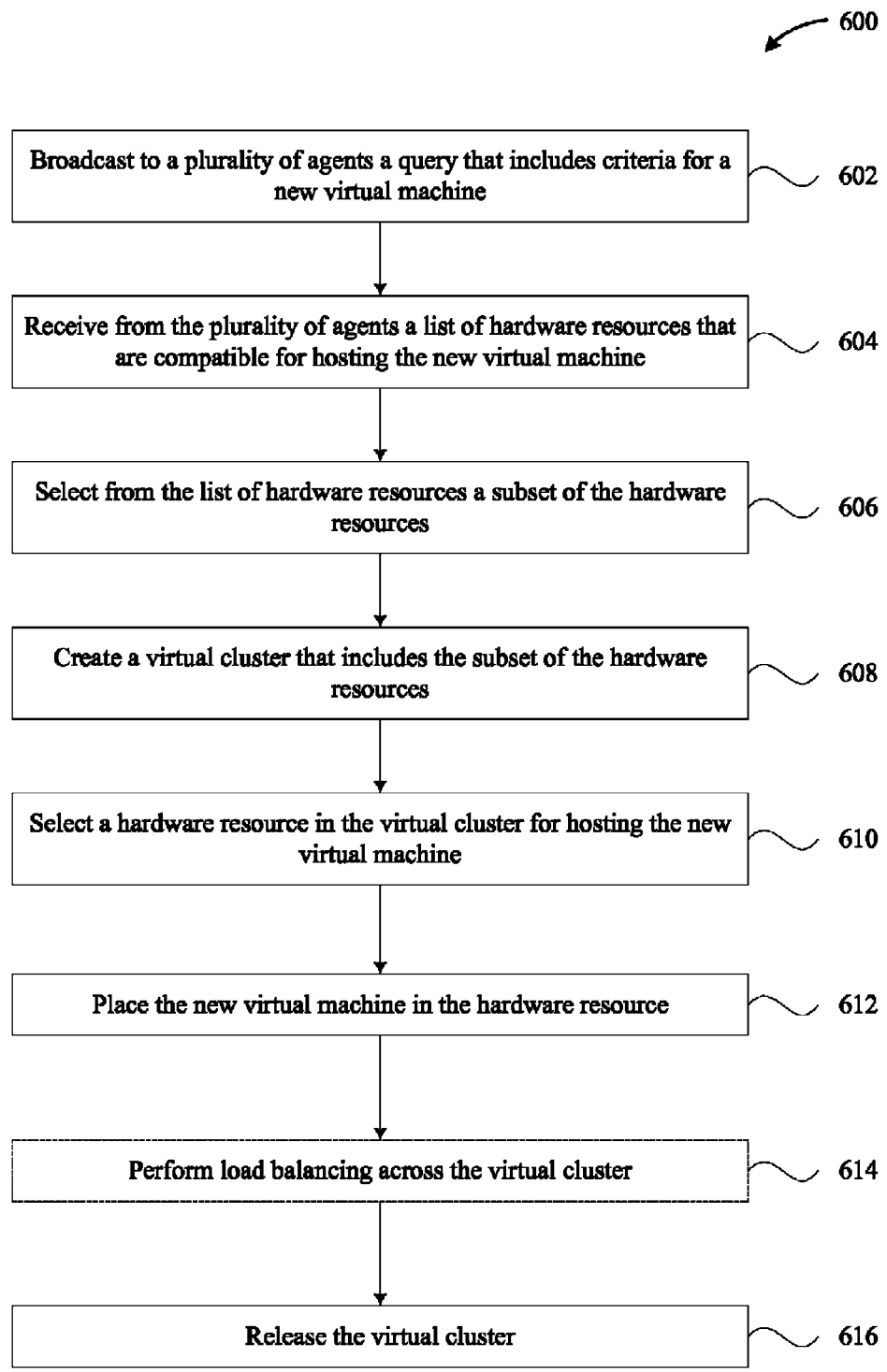
FIG. 6 is a flow diagram that illustrates a method for initial placement of a data object within hardware resources in a distributed system, according to one or more embodiments of the present invention.

FIG. 6 is a flow diagram that illustrates a method 600 for an initial placement of a data object within hardware resources in a distributed system, according to one or more embodiments of the present invention. In one embodiment, the data object is a VM and the distributed system is a virtualized computer system including one or more host computers.

At step 602, VM manager 102 broadcasts a query to a plurality of agents. The query includes one or more criteria for a new virtual machine. At step 604, VM manager 102 receives, from the plurality of agents, a list of hardware resources (e.g., host systems) that are compatible for hosting the new virtual machine. Alternatively, VM manager 102 may reference statistical information associated with the hardware resources—such as cached data maintained by VM manager 102—that was obtained via recent queries made to the plurality of agents. At step 606, VM manager 102 selects a subset of the hardware resources from the list of hardware resources. At step 608, VM manager 102 creates a virtual cluster that includes the subset of the hardware resources. At step 610, VM manager 102 selects a hardware resource in the virtual cluster for hosting the new virtual machine. In one embodiment, the selected hardware resource is based on a greedy criterion, e.g., locating an optimal hardware resource. In another embodiment, the hardware resource is selected at random. At step 612, VM manager 102 places the new virtual machine in the hardware resource. At step 614, VM manager 102 optionally performs load balancing across the virtual cluster, as indicated by the dotted lines around step 614. Performing load balancing is described in greater detail in FIG. 7, below. At step 616, VM manager 102 releases the virtual cluster.

As described above in conjunction with FIGS. 3A-6, embodiments of the invention provide a technique whereby initial placement of both VM data files and VMs corresponding to the VM data files is performed in an efficient and optimized manner. In some embodiments, the size of VM data files and the size of the VMs are likely to change over time. Accordingly, if the virtualized computer system is left unchecked, the virtualized computer system may become imbalanced. For example, a VM data file that corresponds to a VM for a database that receives a massive amount of requests to store new records would rapidly grow in size such that the storage array in which the VM data file is stored eventually runs out of available memory. In this case, load balancing between the overloaded storage array and one or more additional storage arrays that are underloaded can alleviate the problem.

Figure 7:
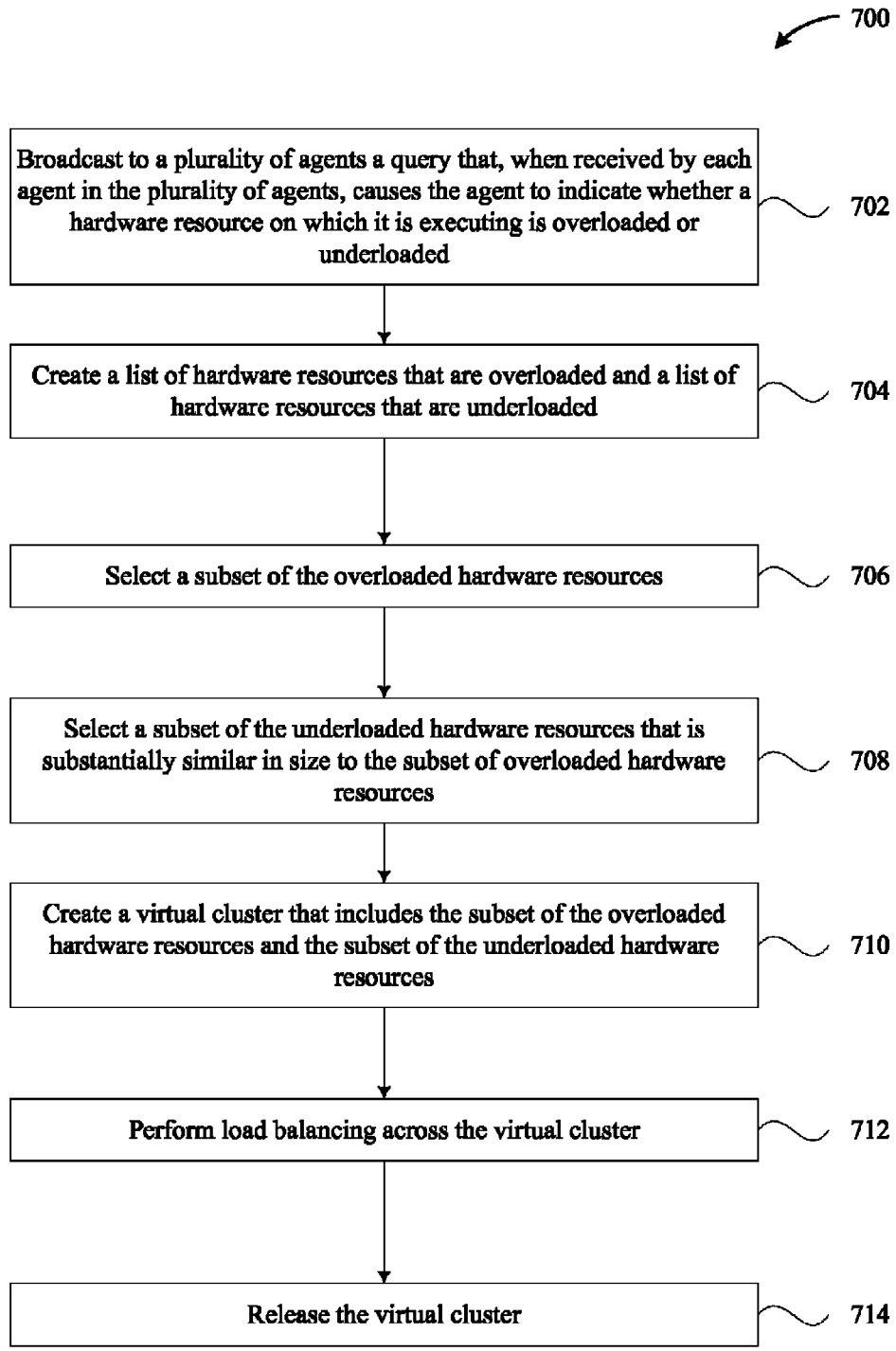
FIG. 7 is a flow diagram that illustrates a method for load balancing hardware resources in a distributed system, according to one or more embodiments of the present invention.

FIG. 7 is a flow diagram that illustrates a method 700 for load balancing hardware resources in distributed system 200, according to one or more embodiments of the present invention. At step 702, VM manager 102 broadcasts a query to a plurality of agents that, when received by each agent in the plurality of agents, causes the agent to transmit a reply indicating whether a hardware resource on which the agent is executing is overloaded or underloaded. Again, VM manager 102 may also reference cached statistical data associated with the hardware resources, as described above in conjunction with FIG. 6. At step 704, VM manager 102 creates, based on the indications from the plurality of agents, a list of hardware resources that are overloaded and a list of hardware resources that are underloaded.

At step 706, VM manager 102 selects a subset of the overloaded hardware resources from the list of overloaded hardware resources. At step 708, VM manager 102 selects a subset of the underloaded hardware resources from the list of underloaded hardware resources. In one embodiment, the subset of the overloaded hardware resources is substantially similar in size to the subset of underloaded hardware resources.

At step 710, VM manager 102 creates a virtual cluster that includes the subset of the overloaded hardware resources and the subset of the underloaded hardware resources. At step 712, VM manager 102 performs load balancing across the virtual cluster. At step 714, VM manager 102 releases the virtual cluster.

The above steps described in method 700 may also be applied to perform power management operations within virtualized computer system 100. Various power management techniques may be implemented, such as those provided by VMware's DRS software. VM manager 102 may periodically query hardware resources to determine which hardware resources are underloaded and compatible with one another, e.g., hardware resources that execute and/or host few data objects, where the data objects are substantially similar to one another. VM manager 102 then creates a virtual cluster of these underloaded hardware resources and attempts to power-off one or more of the hardware resources by first transferring the data objects executing and/or hosted thereon to a different hardware resource included in the virtual cluster. Prior to performing the transfer, VM manager 102 checks to make sure that the hardware resources will not be overloaded when receiving the data objects.

Conversely, VM manager 102 may also power-on hardware resources when virtualized computer system 100 is overloaded. In one embodiment, VM manager 102 queries hardware resources to determine overloaded hardware resources, and VM manager 102 also identifies powered-off host systems that are similar to the overloaded hardware resources. VM manager 102 then powers-on the compatible hardware resources and creates a virtual cluster that includes the compatible hardware resources and the overloaded hardware resources. VM manager 102 subsequently performs a load balancing operation across the virtual cluster such that data objects executing and/or hosted by the overloaded hardware resources are transferred to the powered-on compatible resources.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data, which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for performing initial placement of a data object in a distributed system that includes a plurality of hardware resources, the method comprising:
    receiving a request to create an instance of a virtual machine, the data object comprising a portion of the virtual machine;
    determining, in response to the request, a list of hardware resources that satisfy one or more criteria of the data object;
    creating, in response to the request, a virtual cluster that includes a subset of the hardware resources included in the list of hardware resources;
    selecting a hardware resource from the virtual cluster into which the data object is to be placed;
    placing the data object into the hardware resource; and
    releasing the virtual cluster.

2. The method of claim 1, wherein determining the list of hardware resources involves referencing statistical information associated with the plurality of hardware resources against one or more criteria of the data object.

3. The method of claim 2, wherein the statistical information is managed by periodically querying a plurality of agents, wherein each agent in the plurality of agents executes on a different hardware resource included in the plurality of hardware resources.

4. The method of claim 1, further comprising the steps of:
    performing a load balancing operation across the virtual cluster that causes data objects to be transferred between the hardware resources included in the virtual cluster.

5. The method of claim 1, wherein selecting the hardware resource comprises selecting the hardware resource at random or selecting the hardware resource based on at least a portion of the one or more criteria of the data object.

6. The method of claim 5, wherein the one or more criteria specifies that the hardware resources do not exceed a threshold level of current utilization.

7. The method of claim 1, wherein the data object comprises a virtual disk associated with the virtual machine and each hardware resource comprises a different storage array.

8. The method of claim 7, wherein the one or more criteria of the data object includes at least one of a type requirement, a space utilization requirement, and an input/output (I/O) load requirement.

9. The method of claim 1, wherein the data object comprises an executable portion of the virtual machine and each hardware resource comprises a different host system configured to execute the executable portion of the virtual machine.

10. The method of claim 9, wherein the executable portion of the virtual machine is placed into a host system that is coupled to a storage array that stores a virtual disk corresponding to the executable portion of the virtual machine.

11. The method of claim 9, wherein the one or more criteria of the data object includes at least one of a type requirement, a central processing unit (CPU) utilization requirement, and a virtual machine-to-host system affinity requirement.

12. A non-transitory computer-readable storage medium storing instructions that, when executed by a processor, cause the processor to perform initial placement of a data object in a distributed system that includes a plurality of hardware resources, by performing the steps of:

receiving a request to create an instance of a virtual machine, the data object comprising a portion of the virtual machine;

determining, in response to the request, a list of hardware resources that satisfy one or more criteria of the data object;

creating, in response to the request, a virtual cluster that includes a subset of the hardware resources included in the list of hardware resources;

selecting a hardware resource from the virtual cluster into which the data object is to be placed;

placing the data object into the hardware resource; and releasing the virtual cluster.

13. The non-transitory computer-readable storage medium of claim 12, further comprising the steps of:

performing a load balancing operation across the virtual cluster that causes data objects to be transferred between the hardware resources included in the virtual cluster.

14. The non-transitory computer-readable storage medium of claim 12, wherein selecting the hardware resource comprises selecting the hardware resource at random or selecting the hardware resource based on at least a portion of the one or more criteria of the data object.

15. A method of performing a load balancing operation across a plurality of hardware resources, the method comprising:

receiving a request to perform the load balancing operation;

receiving a signal from each of a plurality of agents, that indicates a loading level of a hardware resource on which the agent is executing;

generating a list of hardware resources that are overloaded and a list of hardware resources that are underloaded;

selecting, from the list of hardware resources that are overloaded, a first subset of hardware resources;

selecting, from the list of hardware resources that are underloaded, a second subset of hardware resources;

creating, in response to the request, a virtual cluster that includes the first subset of hardware resources and the second subset of hardware resources;

performing a load balancing operation that causes data objects to be transferred between the hardware resources included in the virtual cluster; and releasing the virtual cluster.

16. The method of claim 15, wherein the load balancing operation further comprises powering-off underloaded hardware resources included in the virtual cluster after the data objects have been transferred between the hardware resources.

17. The method of claim 15, wherein the plurality of hardware resources includes at least two storage arrays.

18. The method of claim 17, wherein a storage array is overloaded when an amount of free space available on the storage array falls beneath a particular percentage, or when an input/output (I/O) load on the storage array exceeds a particular threshold value.

19. The method of claim 15, wherein the plurality of hardware resources includes at least two host systems.

20. The method of claim 19, wherein a host system is overloaded when a utilization load on a central processing unit (CPU) included in the host system exceeds a particular percentage.

21. The method of claim 15, wherein the second subset includes a substantially similar number of hardware resources as the first subset.

22. A non-transitory computer-readable storage medium storing instructions that, when executed by a processor, cause the processor to perform a load balancing operation across a plurality of hardware resources, by performing the steps of:

receiving a request to perform the load balancing operation;

receiving a signal from each of a plurality of agents, that indicates a loading level of a hardware resource on which the agent is executing;

generating a list of hardware resources that are overloaded and a list of hardware resources that are underloaded;

selecting, from the list of hardware resources that are overloaded, a first subset of hardware resources;

selecting, from the list of hardware resources that are underloaded, a second subset of hardware resources;

creating, in response to the request, a virtual cluster that includes the first subset of hardware resources and the second subset of hardware resources;

performing a load balancing operation that causes data objects to be transferred between the hardware resources included in the virtual cluster; and releasing the virtual cluster.

23. The non-transitory computer-readable storage medium of claim 22, wherein the load balancing operation further comprises powering-off underloaded hardware resources included in the virtual cluster after the data objects have been transferred between the hardware resources.

24. A system configured to perform an initial placement of a data object, comprising:

a plurality of hardware resources; and a server machine, configured to:

receive a request to create an instance of a virtual machine, the data object comprising a portion of the virtual machine;

determine, in response to the request, a list of hardware resources that satisfy one or more criteria of the data object;

create, in response to the request, a virtual cluster that includes a subset of the hardware resources included in the list of hardware resources;

select a hardware resource from the virtual cluster into which the data object is to be placed;

place the data object into the hardware resource; and release the virtual cluster.

25. The system of claim 24, wherein the server machine determines the list of hardware resources by referencing statistical information associated with the plurality of hardware resources against one or more criteria of the data object.

26. The system of claim 25, wherein the server machine manages the statistical information by periodically querying a plurality of agents, wherein each agent in the plurality of agents executes on a different hardware resource included in the plurality of hardware resources.

27. The system of claim 26, wherein the managing entity is further configured to:

perform a load balancing operation across the virtual cluster that causes data objects to be transferred between the hardware resources included in the virtual cluster.

28. The system of claim 26, wherein selecting the hardware resource comprises selecting the hardware resource at random or selecting the hardware resource based on at least a portion of the one or more criteria of the data object.

29. The system of claim 28, wherein the one or more criteria specifies that the hardware resources do not exceed a threshold level of current utilization.

30. The system of claim 26, wherein the data object comprises a virtual disk associated with the virtual machine and each hardware resource comprises a different storage array.

31. The system of claim 28, wherein the one or more criteria of the data object includes at least one of a type requirement, a space utilization requirement, and an input/output (I/O) load requirement.

32. The system of claim 26, wherein the data object comprises an executable portion of the virtual machine and each hardware resource comprises a different host system configured to execute the executable portion of the virtual machine.

33. The system of claim 32, wherein the executable portion of the virtual machine is placed into a host system that is coupled to a storage array that stores a virtual disk corresponding to the executable portion of the virtual machine.

34. The system of claim 32, wherein the one or more criteria of the data object includes at least one of a type requirement, a central processing unit (CPU) utilization requirement, and a virtual machine-to-host system affinity requirement.

\* \* \* \* \*